(12) United States Patent
Takayama

(10) Patent No.: US 12,078,712 B2
(45) Date of Patent: Sep. 3, 2024

(54) RADAR APPARATUS

(71) Applicant: DENSO CORPORATION, Kariya (JP)

(72) Inventor: Takuya Takayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 814 days.

(21) Appl. No.: 17/092,634

(22) Filed: Nov. 9, 2020

(65) Prior Publication Data

US 2021/0055401 A1 Feb. 25, 2021

Related U.S. Application Data

(63) Continuation of application No. PCT/JP2019/018558, filed on May 9, 2019.

(30) Foreign Application Priority Data

May 11, 2018 (JP) .................................. 2018-092390

(51) Int. Cl.
| | | |
|---|---|---|
| G01S 13/28 | (2006.01) | |
| G01S 7/288 | (2006.01) | |
| G01S 7/40 | (2006.01) | |
| G01S 13/931 | (2020.01) | |

(52) U.S. Cl.
CPC ............ *G01S 13/282* (2013.01); *G01S 7/288* (2013.01); *G01S 7/4056* (2013.01); *G01S 13/931* (2013.01); *G01S 7/2883* (2021.05); *G01S 2013/9327* (2020.01)

(58) Field of Classification Search
CPC .......... G01S 7/354; G01S 7/356; G01S 7/288; G01S 7/4056; G01S 13/931; G01S 13/282; G01S 2013/93271
USPC ............................. 342/70, 192, 196, 91, 201
See application file for complete search history.

(56) References Cited

U.S. PATENT DOCUMENTS

| | | | | |
|---|---|---|---|---|
| 3,943,511 | A * | 3/1976 | Evans | ................... G01S 7/2813 |
| | | | | 342/194 |
| 5,546,085 | A * | 8/1996 | Garnaat | .................. G01S 7/023 |
| | | | | 342/25 A |
| 5,633,642 | A * | 5/1997 | Hoss | ................... B60K 31/0008 |
| | | | | 342/70 |

(Continued)

FOREIGN PATENT DOCUMENTS

JP 2004-233157 A 8/2004

OTHER PUBLICATIONS

Mark A. Richards, 'Fundamentals of Radar Signal Processing' Chapter 5: Doppler Processing, pp. 225-231.

*Primary Examiner* — Vladimir Magloire
*Assistant Examiner* — Michael W Justice
(74) *Attorney, Agent, or Firm* — MASCHOFF BRENNAN

(57) ABSTRACT

A radar apparatus is provided with a data calculation unit, a first threshold calculation unit, a second threshold calculation unit, a detection threshold calculation unit and a peak detecting unit. The data calculation unit performs a frequency analysis of the reception signal to produce complex data. The first threshold calculating unit adds a predetermined addition value to a power value of the average data where the complex data is averaged to calculate a first threshold. The second threshold calculation unit calculates a second threshold based on a noise power. The detection threshold calculation unit calculates, for each frequency bin, a larger value of the first threshold and the second threshold to be the detection threshold.

5 Claims, 14 Drawing Sheets

(56) References Cited

U.S. PATENT DOCUMENTS

| | | | |
|---|---|---|---|
| 6,011,515 A * | 1/2000 | Radcliffe | G01P 3/64 340/936 |
| 6,556,871 B2 * | 4/2003 | Schmitt | A61N 1/37211 607/30 |
| 6,801,580 B2 * | 10/2004 | Kadous | H04L 1/0618 375/267 |
| 6,844,843 B2 * | 1/2005 | Ishii | G01S 7/4021 342/91 |
| 7,042,344 B2 * | 5/2006 | Chiba | G01S 13/66 340/686.6 |
| 7,058,144 B2 * | 6/2006 | Baldwin | H04L 25/0212 375/229 |
| 7,194,041 B2 * | 3/2007 | Kadous | H04L 1/0618 375/267 |
| 7,265,665 B2 * | 9/2007 | Bouchard | G08B 13/1427 340/539.11 |
| 7,339,517 B2 * | 3/2008 | Nakanishi | G01S 13/343 342/91 |
| 7,366,148 B2 * | 4/2008 | Muaddi | H04L 63/1416 455/445 |
| 7,460,058 B2 * | 12/2008 | Nakanishi | G01S 7/36 342/28 |
| 7,623,061 B2 * | 11/2009 | Spyropulos | G01S 13/42 342/170 |
| 7,729,680 B2 * | 6/2010 | Gozen | H04B 1/1027 455/226.1 |
| 7,760,680 B2 * | 7/2010 | Chen | H04L 47/822 455/452.2 |
| 7,773,031 B2 * | 8/2010 | Gazelle | G01S 7/2926 342/174 |
| 8,125,375 B2 * | 2/2012 | Nakanishi | G01S 7/023 342/91 |
| 8,243,790 B2 * | 8/2012 | Leontaris | H04N 19/107 375/E7.243 |
| 8,564,474 B2 * | 10/2013 | Maeno | G01S 7/2927 342/91 |
| 8,750,372 B2 * | 6/2014 | Leontaris | H04N 19/553 382/162 |
| 8,830,117 B2 * | 9/2014 | Maeno | G01S 7/2927 342/91 |
| 8,874,390 B2 * | 10/2014 | Rick | G01S 15/58 702/50 |
| 9,063,213 B2 * | 6/2015 | Himmelstoss | G01S 13/931 |
| 9,110,168 B2 * | 8/2015 | Mohamadi | G01S 13/0209 |
| 9,444,502 B2 * | 9/2016 | Kpodzo | H04B 1/109 |
| 9,748,987 B2 * | 8/2017 | Kpodzo | H04B 17/318 |
| 9,755,790 B2 * | 9/2017 | Lobo | H04B 17/26 |
| 10,054,672 B2 * | 8/2018 | Fetterman | G01S 13/726 |
| 10,067,221 B2 * | 9/2018 | Ginsburg | G01S 7/352 |
| 10,261,172 B2 * | 4/2019 | Lim | G01S 13/931 |
| 10,271,301 B2 * | 4/2019 | Batra | H04B 17/27 |
| 10,353,063 B2 * | 7/2019 | Sakamoto | G01S 7/354 |
| 10,514,454 B1 * | 12/2019 | Parrott | G01F 1/663 |
| 10,585,195 B2 * | 3/2020 | Marmet | H04B 1/7113 |
| 10,775,221 B2 * | 9/2020 | Blomberg | G01S 7/354 |
| 10,962,640 B2 * | 3/2021 | Kaino | G01S 13/343 |
| 10,977,946 B2 * | 4/2021 | Thapani | B60W 40/10 |
| 11,275,174 B2 * | 3/2022 | Smith | G01S 7/023 |
| 11,575,196 B2 * | 2/2023 | Kawaguchi | H01Q 1/38 |
| 2003/0048223 A1 * | 3/2003 | Kezys | H04B 7/0857 342/368 |
| 2003/0058962 A1 * | 3/2003 | Baldwin | H04L 1/20 375/316 |
| 2003/0103520 A1 * | 6/2003 | Chen | H04L 47/801 370/444 |
| 2003/0189999 A1 * | 10/2003 | Kadous | H04L 1/0618 375/267 |
| 2004/0108952 A1 * | 6/2004 | Ishii | G01S 7/4021 342/111 |
| 2004/0162995 A1 * | 8/2004 | Muaddi | H04L 63/1408 709/224 |
| 2004/0217869 A1 * | 11/2004 | Bouchard | G01S 13/825 340/539.13 |
| 2004/0239490 A1 * | 12/2004 | Chiba | G08G 1/166 340/435 |
| 2005/0008092 A1 * | 1/2005 | Kadous | H04L 1/0618 375/267 |
| 2007/0103360 A1 * | 5/2007 | Nakanishi | G01S 13/343 342/111 |
| 2007/0171122 A1 * | 7/2007 | Nakano | G01S 7/023 342/91 |
| 2008/0064357 A1 * | 3/2008 | Gozen | G10L 21/0208 455/296 |
| 2008/0094274 A1 * | 4/2008 | Nakanishi | G01S 7/023 342/91 |
| 2008/0111733 A1 * | 5/2008 | Spyropulos | G01S 7/412 342/189 |
| 2009/0086814 A1 * | 4/2009 | Leontaris | H04N 19/553 375/E7.243 |
| 2009/0201195 A1 * | 8/2009 | Gazelle | G01S 13/0209 342/174 |
| 2010/0254263 A1 * | 10/2010 | Chen | H04L 47/83 370/232 |
| 2011/0050484 A1 * | 3/2011 | Nakanishi | G01S 7/023 342/87 |
| 2012/0007767 A1 * | 1/2012 | Maeno | G01S 7/2927 342/92 |
| 2012/0112955 A1 | 5/2012 | Ando et al. | |
| 2012/0245863 A1 * | 9/2012 | Rick | G01F 15/06 702/50 |
| 2012/0275514 A1 * | 11/2012 | Leontaris | H04N 19/172 375/E7.125 |
| 2013/0021196 A1 * | 1/2013 | Himmelstoss | G01S 7/023 342/159 |
| 2013/0271310 A1 * | 10/2013 | Izumi | G01S 7/4008 342/368 |
| 2013/0309975 A1 * | 11/2013 | Kpodzo | H04B 17/336 455/63.1 |
| 2014/0222246 A1 * | 8/2014 | Mohamadi | G01S 13/0209 701/2 |
| 2014/0313080 A1 * | 10/2014 | Smith | H01Q 19/28 342/368 |
| 2014/0355468 A1 * | 12/2014 | Li | H04W 72/23 370/252 |
| 2016/0291130 A1 * | 10/2016 | Ginsburg | G01S 13/32 |
| 2017/0026126 A1 * | 1/2017 | Kpodzo | H04B 1/10 |
| 2017/0059695 A1 * | 3/2017 | Fetterman | G01S 13/931 |
| 2017/0102459 A1 * | 4/2017 | Sakamoto | G01S 13/347 |
| 2017/0168139 A1 * | 6/2017 | Lim | G01S 7/2921 |
| 2017/0363736 A1 * | 12/2017 | Kaino | G01S 13/931 |
| 2017/0363738 A1 * | 12/2017 | Kaino | G01S 13/584 |
| 2017/0374641 A1 * | 12/2017 | Batra | G01S 5/0244 |
| 2018/0074207 A1 * | 3/2018 | Marmet | H04B 1/709 |
| 2018/0348364 A1 * | 12/2018 | Liu | G01S 13/91 |
| 2018/0366818 A1 * | 12/2018 | Kawaguchi | H01Q 19/005 |
| 2019/0122556 A1 * | 4/2019 | Thapani | B62D 6/003 |
| 2019/0271775 A1 * | 9/2019 | Zhang | G01S 13/003 |
| 2019/0369221 A1 * | 12/2019 | Umehira | G01S 13/34 |
| 2020/0088838 A1 * | 3/2020 | Melzer | G01S 7/352 |
| 2021/0063566 A1 * | 3/2021 | Smith | G06V 20/58 |
| 2021/0132185 A1 * | 5/2021 | Lin | G01S 13/32 |
| 2021/0389446 A1 * | 12/2021 | Sugae | G01S 13/343 |
| 2023/0056263 A1 * | 2/2023 | Kim | H04L 5/0094 |
| 2023/0184926 A1 * | 6/2023 | Owechko | G01S 13/505 342/195 |
| 2023/0198594 A1 * | 6/2023 | Kim | H04L 5/005 370/252 |

* cited by examiner

VARIATION IS PRESENT IN RELATIVE POSITIONAL RELATIONSHIP BETWEEN RADAR
AND REFLECTOR VARIES (VARIATION EXCEEDING mm ORDER)

NO VARIATION IS PRESENT IN RELATIVE POSITIONAL RELATIONSHIP BETWEEN RADAR AND REFLECTOR

RADAR APPARATUS

CROSS-REFERENCE TO RELATED APPLICATION

This application is the U.S. bypass application of International Application No. PCT/JP2019/018558 filed May 9, 2019 which designated the U.S. and claims priority to Japanese Patent Application No. 2018-092390, filed May 11, 2018, the contents of which are incorporated herein by reference.

BACKGROUND

Technical Field

The present disclosure relates to a technique for detecting peaks from a reception signal.

Description of the Related Art

A radar apparatus mounted in a bumper of a vehicle transmits and receives radar waves to acquire a reception signal, and detects a target such as other vehicle or a pedestrian existing in the vicinity of the vehicle in accordance with the acquired reception signal. The reception signal acquired by the radar apparatus mounted on the vehicle possibly includes a signal reflected within the vehicle. The signal reflected within the vehicle includes a reflection signal from the bumper or the radome, or a reflection signal generated in the internal parts of the vehicle and propagated within the vehicle.

SUMMARY

A first aspect of the present disclosure is a radar apparatus mounted on a vehicle, and provided with a transmission antenna, a reception antenna, a signal acquiring unit, a data calculation unit, an average calculation unit, a first threshold calculation unit, a second threshold calculation unit, a detection threshold calculation unit and a peak detecting unit. The transmission antenna transmits radar waves. The reception antenna receives reflected waves produced by reflection of the radar waves. The signal acquiring unit acquires a reception signal based on the reflected waves.

The data calculation unit performs a frequency analysis of the reception signal to calculate a complex data. The first threshold calculating unit adds a predetermined addition value to a power value of the average data where the complex data is averaged to calculate a first threshold. The second threshold calculation unit calculates a second threshold based on a noise power. The detection threshold calculation unit calculates, for each frequency bin, a larger value of the first threshold and the second threshold to be the detection threshold.

DETAILED DESCRIPTION OF THE PREFERRED EMBODIMENTS

Figure 1:
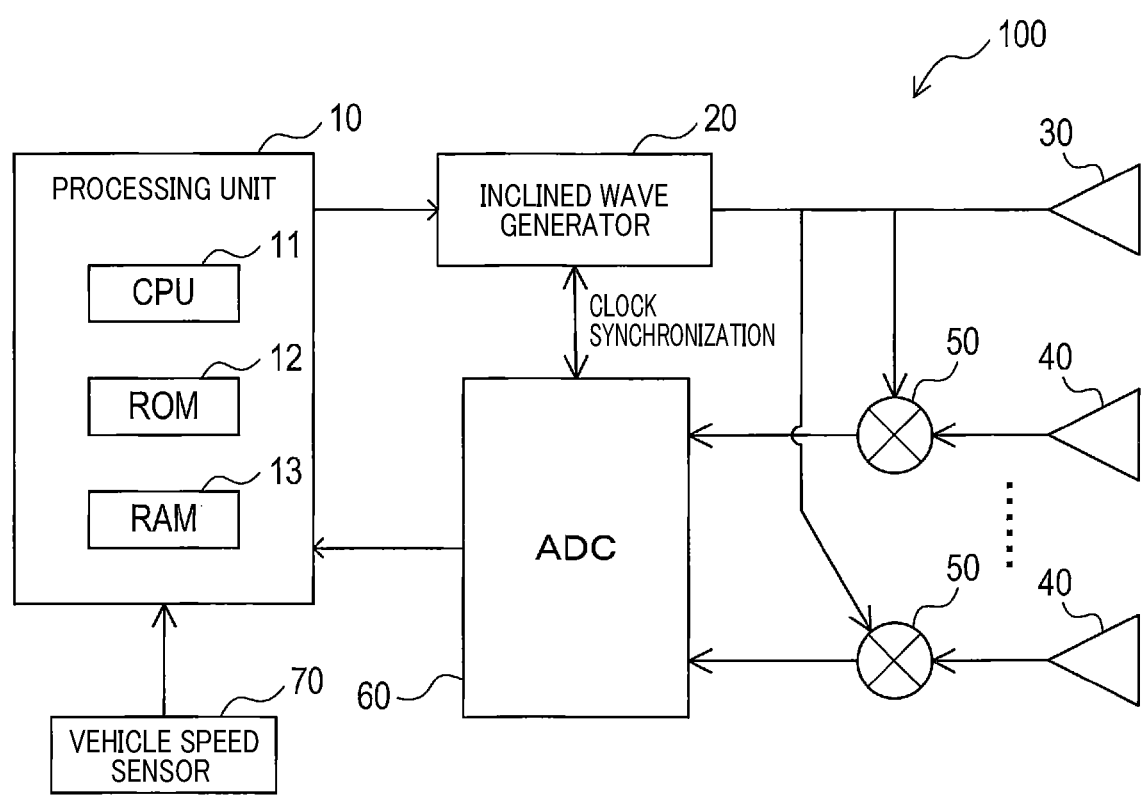
FIG. 1 is a diagram showing a configuration of a radar apparatus according to the first embodiment.

According to a radar apparatus described above, generally, when the radar apparatus detects a target, a noise power value of the radar apparatus is estimated in advance, and a detection threshold is set to be a value in which a predetermined power value is added to the estimated noise power value. Then, the radar apparatus detects a peak in which the spectrum power of the reception signal is larger than the detection threshold. In the case where a similar target detection method is applied to a radar apparatus mounted on a vehicle, a power value of a unwanted internal reflection signal exceeds the detection threshold, whereby not only the peak of the reflection signal reflected at the target but also a peak of the internal reflection signal may be detected. However, it is difficult to predict characteristics of the internal reflection signal in advance, since the internal reflection signal of the vehicle varies and thus becomes complicated depending on the position of the radar apparatus in the vehicle and a relative position between the radar apparatus and the internal parts. Accordingly, even when the peak of the internal reflection signal is detected, it is difficult to distinguish between the peak of the internal reflection signal and the peak of the reflection signal from the target existing near the radar apparatus.

In this respect, as a method for removing a stationary clutter component from the reception signal received by the radar apparatus, moving target indication (i.e. MTI) processing has been proposed. In MTI processing, high-pass filtering in time series manner is applied to each frequency bin of the power spectrum of the reception signal, thereby generating a reception signal in which only the stationary clutter component having less phase variation of the amplitude is suppressed. Then, the MTI processing detects the detection threshold for the generated reception signal and compares the power of the reception signal with the detection threshold, thereby detecting the peaks.

However, according to the MTI processing, in the case where the amplitude or the phase component of the signal to be suppressed is not completely stopped, or the characteristics of the radar system varies with respect to time, the signal cannot be completely suppressed. Hence, when the amplitude or the phase component of the signal to be suppressed varies even just a little, the power of the signal to be suppressed becomes larger than the detection threshold, and thus the signal may detected as a peak. As a result of keen research of the inventor, the inventor has discovered a problem in which in the case where the MTI processing is applied to the reception signal acquired by the radar apparatus mounted on the vehicle, the amplitude or the phase component of the internal reflection signal minutely changes such that the internal reflection signal is insufficiently suppressed, and thus may cause an erroneous detection of the internal reflection signal. As a reference, a non-patent literature related to this field is: Mark A. Richards, 'Fundamentals of Radar Signal Processing' Chapter 5: Doppler Processing.

According to the present disclosure, it is desirable to suppress erroneous detection of the internal reflection signal of the vehicle in the radar apparatus mounted on the vehicle. Hereinafter, with reference to the drawings, embodiments of the present disclosure will be described.

First Embodiment

<1. Configuration>

Figure 6:
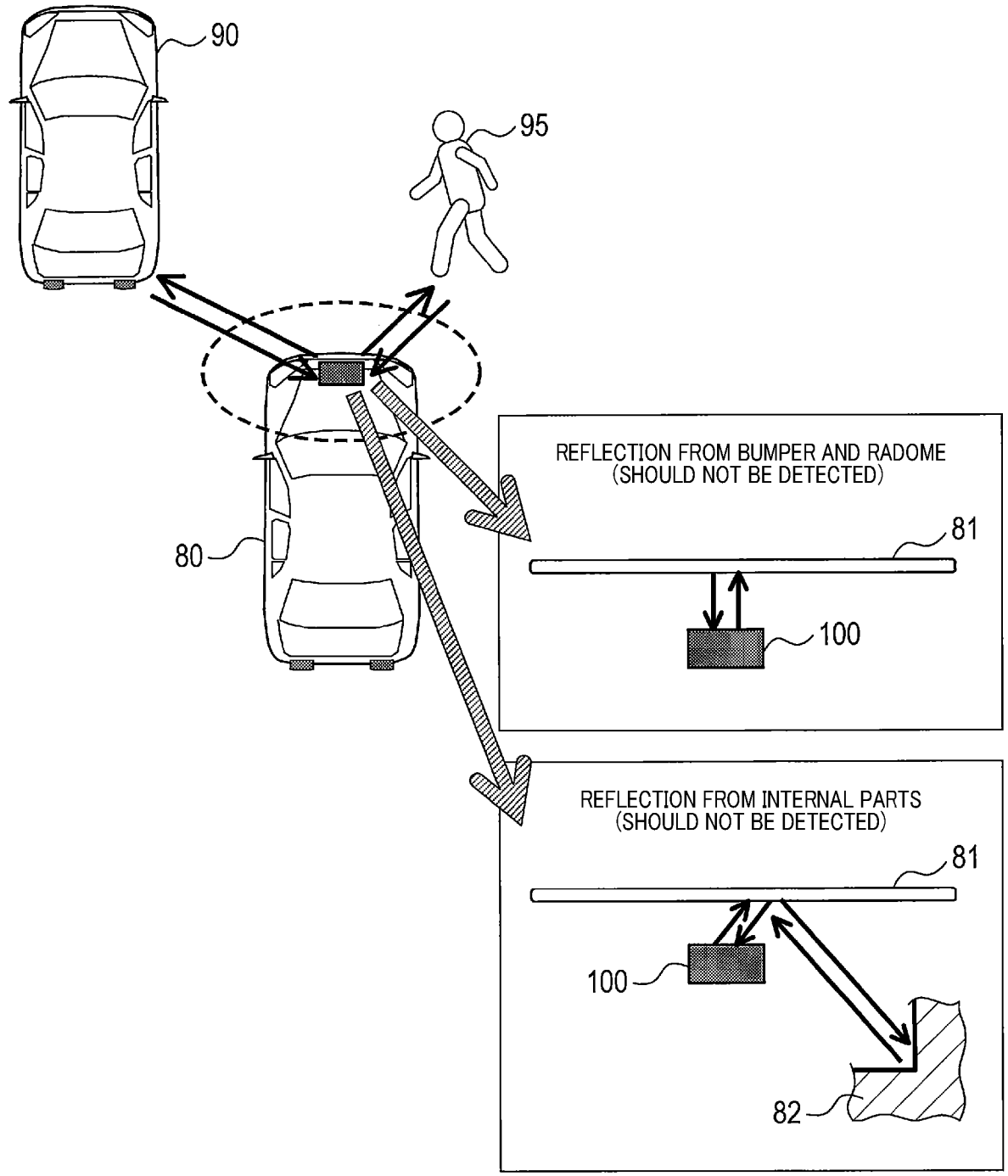
FIG. 6 is an explanatory diagram showing a reflection from the target and an internal reflection in the vehicle.

Firstly, a configuration of a radar apparatus 100 according to the present embodiment will be described with reference to FIG. 1. The radar apparatus 100 is configured as a radar apparatus using a frequency modulated continuous wave (hereinafter referred to as FMCW) method. As shown in FIG. 6, the radar apparatus 100 is mounted at a center portion of a vehicle 80 in the vehicle width direction inside a bumper 81 in the front side of the vehicle 80.

The radar apparatus 100 is provided with a processing unit 10, an inclined wave generator 20, a transmission antenna 30, a K-channel reception antenna 40 (K is natural number), K number of mixers 50 and an AD converter 60.

The processing unit 10 is mainly configured of a microcomputer provided with CPU 11, a ROM 12, a RAM 13 and an I/O unit. The processing unit 10 generates a frequency control unit that sets the frequency of the transmission signal, and transmits the generated frequency control signal to the inclined wave generator 20. The inclined wave generator 20 generates a radar signal in accordance with the frequency control signal received from the processing unit 10, and transmits the generated radar signal to the transmission antenna 30. The inclined wave generator 20 supplies the generated radar signal to each of K mixers 50.

Figure 2:
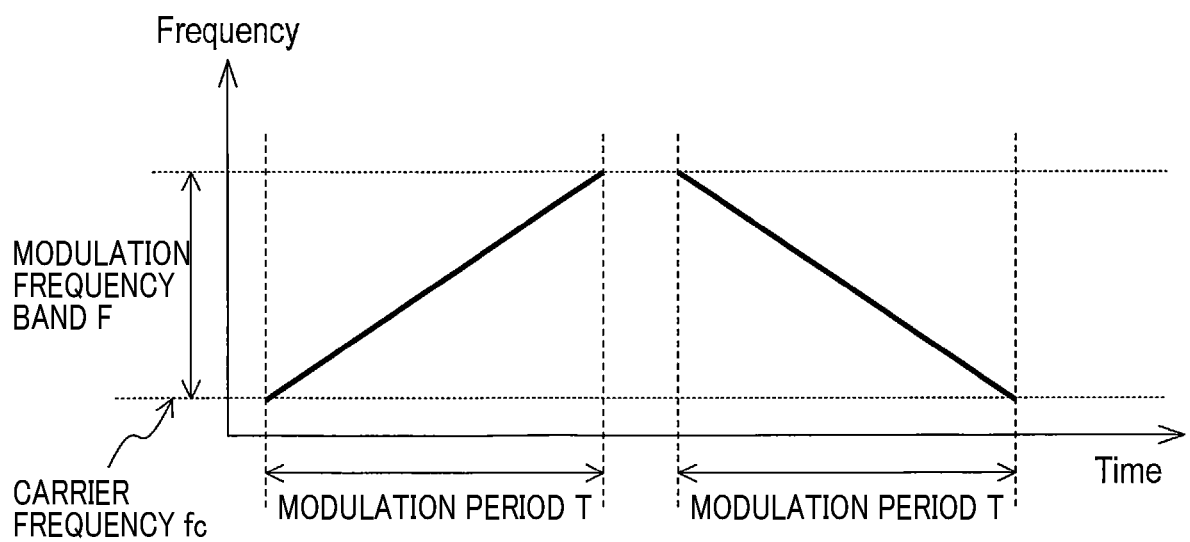
FIG. 2 is a diagram showing a FMCW modulation wave.

The transmission antenna 30 emits FMCW-modulated radar waves based on the radar signal received from the inclined wave generator 20. Specifically, as shown in FIG. 2, the transmission antenna 30 repeatedly transmits, at each processing cycles, a combination of an upward inclined wave of which the frequency simply increases from the carrier frequency fc to fc+F in the modulation period T and a downward inclined wave of which the frequency simply decreases from Fc+F to Fc.

The K reception antennas 40 are arranged in a row in the horizontal direction. Each of the reception antenna 40 receives reflected waves produced by a reflection of the radar waves at the reflector, and supplies the reflection signal to the mixer 50.

Figure 4:
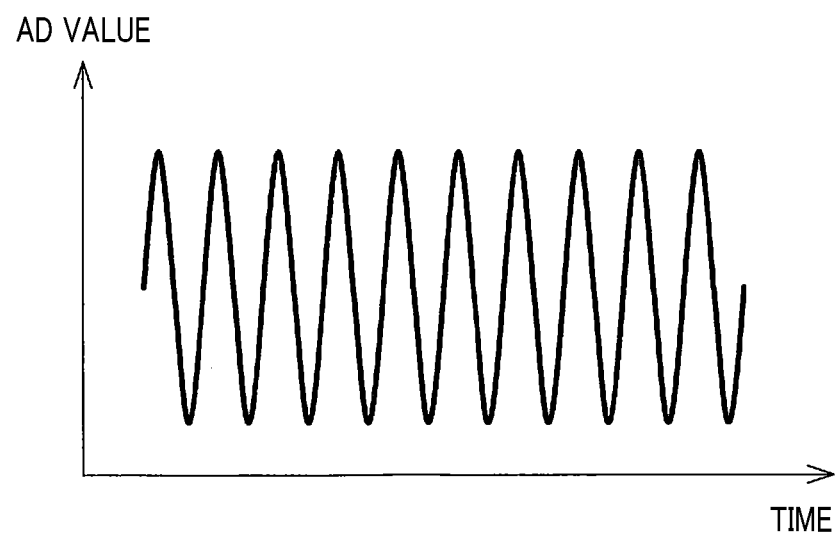
FIG. 4 is a timing diagram showing a beat signal.

The K mixers 50 are each provided for each reception antenna 40. Each of the mixer 50 mixes the radar signal supplied from the inclined wave generator 20 with the reflection signal supplied from the reception antenna 40 to generate a frequency difference signal B (t) (hereinafter referred to as beat signal) having a frequency component as a frequency difference between the radar signal and the reflection signal. FIG. 4 shows a timing diagram of the beat signal B (t). The beat signal B (t) is expressed by the following equation (1). fb represents a beat frequency in which a value of two terms being summed expresses a beat frequency in the downward slope, and a value where the latter term is subtracted from the previous term expresses a beat frequency in the upward slope. 0, represents an initial phase. c represents the speed of light, v a speed of target with respect to the radar apparatus 100, r represents a distance between the radar apparatus 100 and the target.

[Math 1]

$$B(t) = \cos(2\pi f_b t + \theta_i) \quad (1)$$
$$f_b = \frac{2F}{cT}r \pm \frac{2f_c}{c}v$$
$$\theta_i = \frac{4\pi f_c}{c}r$$

Then, the respective mixers 50 transmit the generated beat signals B (t) to the AD converter 60. According to the present embodiment, the beat signal B (t) corresponds to reception signal and the mixer 50 and the AD converter 60 correspond to a signal acquiring unit.

The AD converter 60 samples each of the K-channel beat signals B (t) transmitted from the K number of mixers 50 to generate a discrete beat signal b (t) and transmits the generated K-channel discrete beat signals b (t) to the processing unit 10. Specifically, the AD converter 60 is clock-synchronized to the inclined wave generator 20, and at each processing cycles, the AD converter starts sampling of the beat signal B (t) for a certain time interval, after being offset for a predetermined period in response to a start of the transmission of the radar waves.

The processing unit 10 executes a signal processing such as frequency analysis for K-channel discrete beat signals acquired from the AD converter 60. In the processing unit 10, the CPU 11 loads programs stored in a non-transitory tangible recording media and executes the programs, thereby achieving functions of a data calculation unit, an average calculation unit, a first threshold calculation unit, a second threshold calculation unit, a detection threshold calculation unit and a peak detecting unit. The method for achieving these functions is not limited to software, but a part of or all of functions may be achieved by using a hardware in which logic circuits and analog circuits are combined. Further, the processing unit 10 receives a detection signal from a vehicle speed sensor that detects a travelling speed of the vehicle 80.

<2. Processing>
<2-1. Overall Processing>

Figure 3:
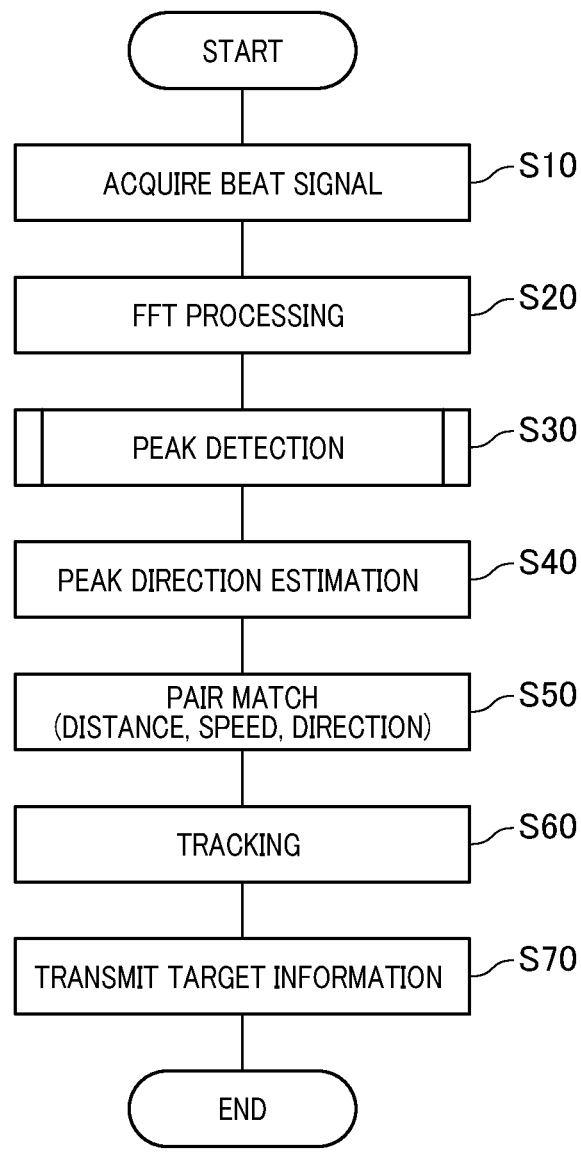
FIG. 3 is a flowchart showing a procedure of a target information acquiring process according to the first embodiment.

Next, a procedure of a target information acquiring process executed by the processing unit 10 will be described with reference to a flowchart shown in FIG. 3. The processing unit 10 repeatedly executes the target information acquiring process each time when transmitting the radar waves.

Firstly, at step S10, the processing unit 10 acquires the K-channel discrete beat signals b (t) in the upward slope wave and the downward slope wave which are sampled by the AD converter 60.

Figure 5:
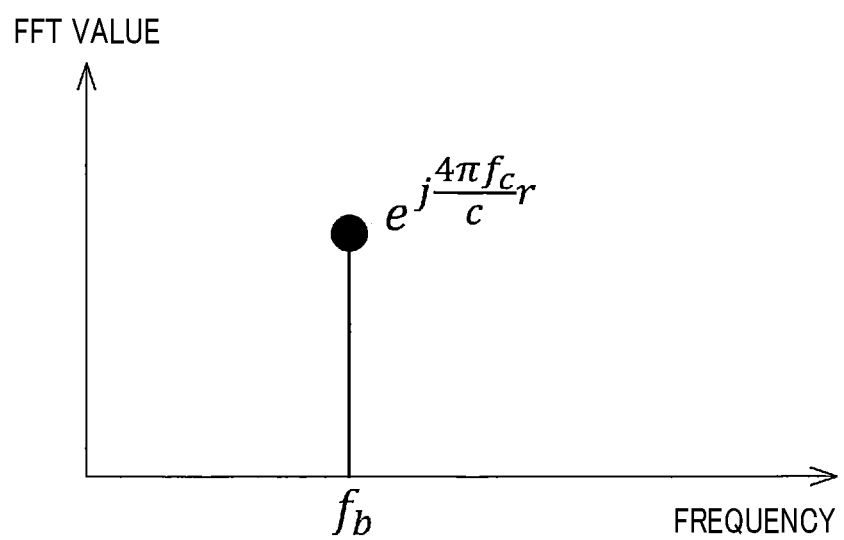
FIG. 5 is a diagram showing a frequency spectrum of the beat signal.

Subsequently, at step S20, the processing unit 10 executes a complex FFT process for each of the discrete beat signals b (t) in the upward slope and the downward slope for respective channels, and calculates FFT complex data for each of the upward slope and the downward slope as shown in FIG. 5. The complex FFT process is an example of a frequency analysis. The FFT complex data S (t0, fb) at time t0 in the current processing cycle is, as expressed in the following equation (2), a function of the beat frequency fb. The FFT complex data S (t0, fb) includes a magnitude of the amplitude and the information of its phase. The phase of the FFT complex data (t0, fb) sharply reacts when the reflector moves even just a little. For example, in the case where the carrier frequency fc is 77 GHz, the phase rotates by 185° when the position of the reflector changes by 1 mm.

[Math 2]

$$s(t_0, f_b) = e^{j\frac{4\pi f_c}{c}r} \delta(f - f_b) \quad (2)$$

Figure 7:
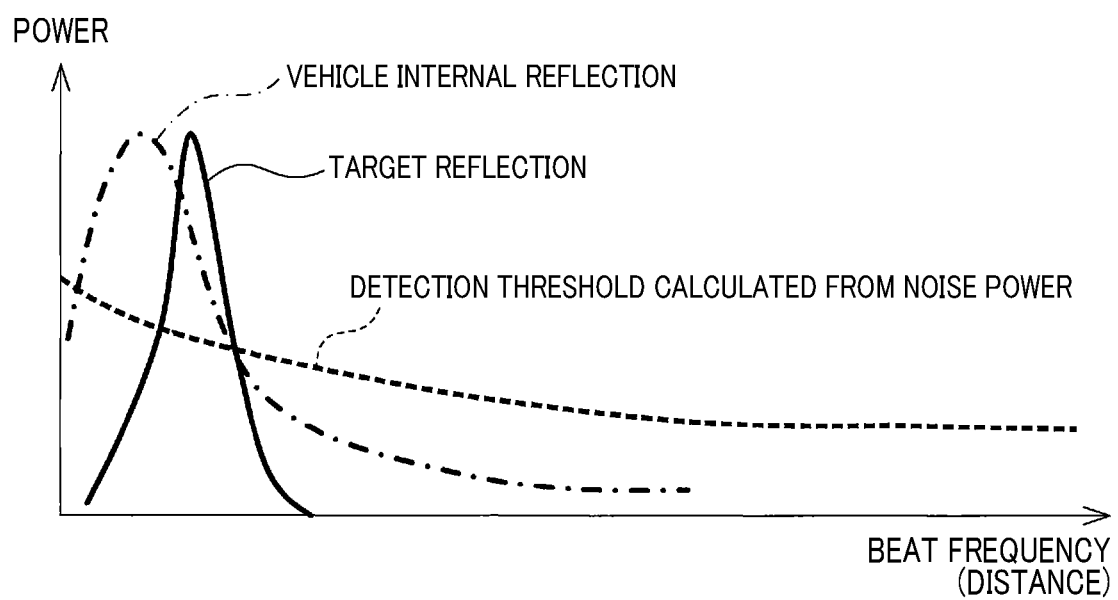
FIG. 7 is a graph showing the spectrum power of the target reflection and the internal reflection of the vehicle, and a threshold calculated from the noise power.

The power spectrum Ps of the FFT complex data S (t0, fb) is expressed by a graph in which the solid line and the dashed line in FIG. 7 are combined. The beat frequency fb is correlated with the distance r and represents the distance information. The processing unit 10 accumulates the FFT complex data (t0, fb) in the upward slope for K-channel at each frequency bin to calculate synthesized complex data Sk (t0, fb) in the upward slope. Further, the processing unit 10 accumulates the FFT complex data (t0, fb) in the downward slope for K-channel at each frequency bin to calculate synthesized complex data Sk (t0, fb) in the downward slope. According to the present embodiment, the synthesized complex data Sk (t0, fb) corresponds to complex data.

Subsequently, at step S30, the processing unit 10 compares each of the synthesized complex data Sk (t0, fb) in the upward slope and downward slope with a detection threshold (described later) for every frequency bin. Then, the processing unit 10 detects, from each of synthesized complex data Sk (t0, fb) of the upward slope and the downward slope, a beat frequency fb as a peak (hereinafter referred to as peak frequency) in which the power value of the synthesized complex data Sk (t0, fb) is larger than the detection threshold, and indicating the maximum. In the case where a plurality of targets are observed, a plurality of peak frequencies are detected. Note that a process of a peak detection will be described in detail later.

Next, at step S40, the processing unit 10 extracts, from each of the FFT complex data (t0, fb) in the upward slope and the downward slope for K-channels, frequency components of the peak frequencies detected at step S30. Then, the processing unit 10 executes an incoming direction estimation process for K peak frequency components in the upward slope and the downward slope using an algorithm such as multiple signal classification (MUSIC), thereby estimating an azimuth of each target with respect to the vehicle 80. Similarly, the processing unit 10 executes the incoming direction estimation process for the extracted K peak frequency components in the upward slope and the downward slope, thereby estimating an azimuth of each target with respect to the vehicle 80.

Subsequently, at step S50, the processing unit 10 performs a pair-matching for a peak frequency in the upward slope and a peak frequency in the downward slope which correspond the same target, using azimuths of respective targets in the upward slope and the downward slope estimated at step S40 and the power information of the synthesized complex data Sk (t0, fb) in the upward slope and the downward slope. Then, the processing unit 10 calculates, using the peak frequencies in the upward slope and the downward slope which are paired, the speed v of the target with respect to the vehicle 80 and the distance r between the target and the vehicle 80 for each target.

Next, at step S60, the processing unit 10 performs tracking of the target detected at the current processing cycle. In other words, the processing unit 10 connects the target information detected up to the previous processing cycle and the target information detected at the current processing cycle and calculates a moving direction or the like of the target.

Subsequently, at step S70, the processing unit 10 transmits the target information such as the target speed v, the distance r, the azimuth, the moving direction to the ECU. The ECU executes an application such as a travelling support using the target information. For example, the ECU executes an application that outputs an alert when determined that the probability of collision between the vehicle 80 and the target using the target information. Then, the process terminates the procedure.

According to the present embodiment, the process at step S20 corresponds to a function of the data calculation unit which is achieved by the processing unit 10.

<2-2. Internal Reflection>

Next, a reflection signal received by the radar apparatus 100 will be described. As shown in FIG. 6, the radar apparatus 100 regards an other vehicle 90 or a pedestrian existing in the vicinity of the vehicle 80 as a target to be detected. However, the radar apparatus 100 receives internal reflected waves of the vehicle 80 which are not desired to be detected, in addition to reflected waves from the target. The internal reflected waves are reflected waves produced in the vehicle 80, and include reflected waves in which the transmission waves are reflected at the bumper 81. In the case where the radar apparatus 100 is provided outside the bumper 81, the internal reflected waves include reflected waves produced by the transmission waves reflected at a radome protecting the radar apparatus 100 instead of the bumper 81. Further, the internal reflected waves also include reflected waves produced by the transmission waves reflected at internal parts 82 of the vehicle 80. The transmission waves may be transmitted to the internal parts 82 via the bumper 81 and may be reflected at the internal parts 82. Moreover, the reflected waves produced by reflection at the internal parts 82 may be transmitted to the radar apparatus 100 via the bumper 81.

The relative position between the radar apparatus 100 (i.e. transmission antenna 30 and reception antenna 40), the bumper 81 and the internal parts 82 rarely varies with respect to time. Specifically, the relation position varies within a range of millimeter order or less with respect to time. Hence, the phase of the amplitude of the synthesized complex data Sk (t0, fb) indicating the internal reflection signal of the vehicle rarely varies with respect to time. On the other hand, the relative position between the radar apparatus 100 and the target varies over a range of millimeter order with respect to time. Accordingly, variation of the phase of the amplitude of the synthesized complex data Sk (t0, fb) indicating a target reflection signal is relatively large.

As shown in FIG. 7, in the power spectrum Ps of the synthesized complex data Sk (t0, fb), a peak pk_i indicating the vehicle internal reflection signal appears at a position corresponding to a distance close to the vehicle 80. Further, in the power spectrum Ps, a peak pk_t indicating a close target existing close to the radar apparatus 100 also appears at a position close to the peak pk_i. Hence, in the case where the peak is detected by comparing the power value of the power spectrum Ps with the detection threshold calculated based on the noise power, both of the peak_i and the peak_t are detected. In this case, it is difficult to determine which of the detected peak pk_i, pk_t indicate which of the vehicle internal reflection or the target.

According to the present embodiment, the detection threshold is obtained from the noise power. The noise power is a power other than the reflection power from the power such as a thermal noise power of the radar apparatus 100 and the road surface reflection power. For example, when the target is set to be only a pedestrian, the reflection power from other vehicles is determined to be a noise power.

Figure 8:
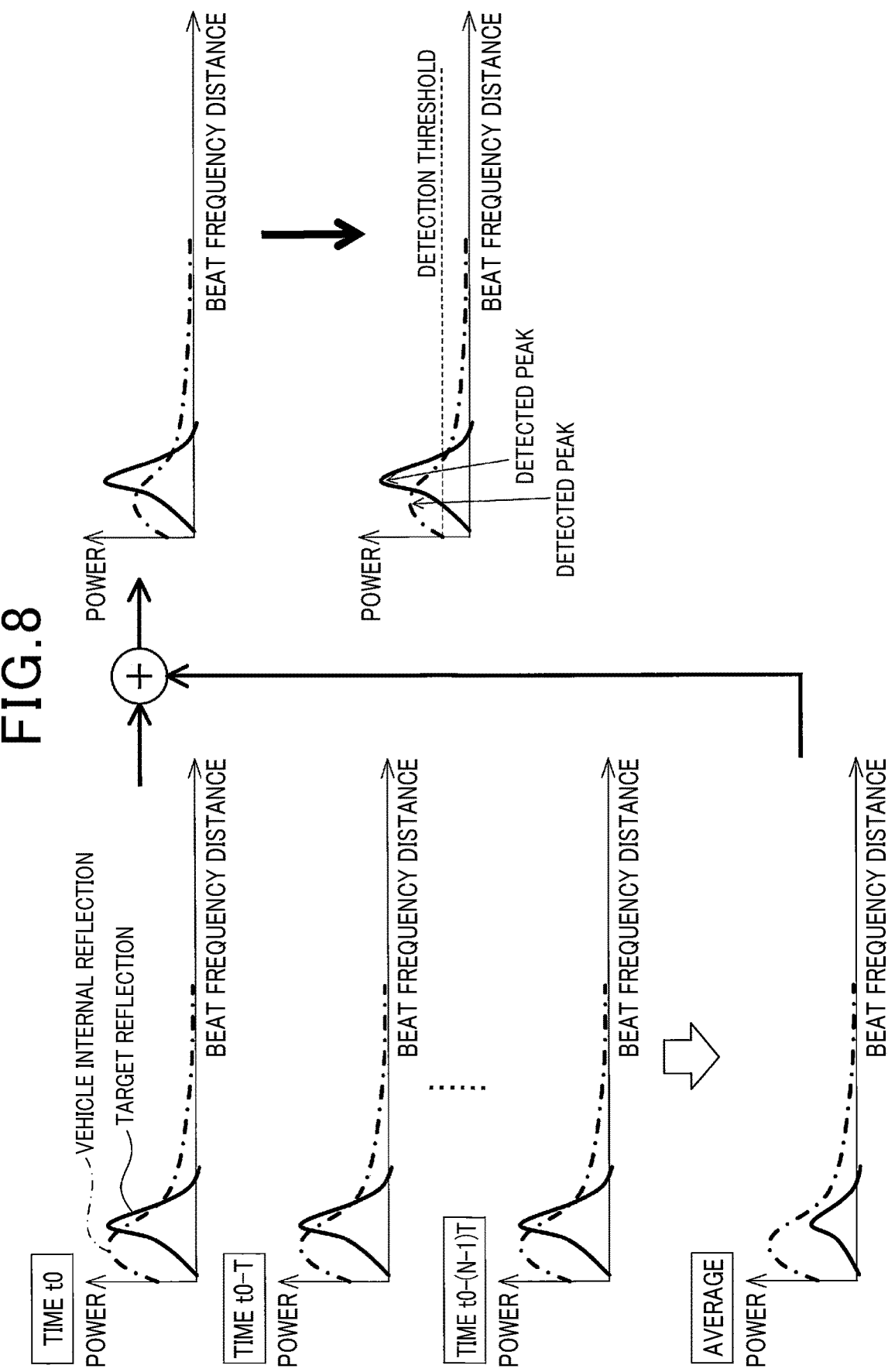
FIG. 8 is an explanatory diagram showing a peak detecting method using the MTI processing.

Here, as a method for suppressing a stationary clutter component in the reception signal, the MTI processing shown in FIG. 8 is proposed. In the MTI processing, a high-pass filter is applied to the FFT complex data S (t, fb) in time series for each channel and each distance bin (i.e. frequency bin), thereby generating suppressed data Sm (t, fb) in which a signal having no amplitude and no phase variation is suppressed. In order to facilitate the explanation, according to FIG. 8, the high-pass filtering process is substituted by a process of removing an average value in time series in a period of t0−nT (n=0, 1, . . . N−1) from the FFT complex data (t, fb) at t0, where N is natural number indicating the number of processing cycles in the time-series of the high-pass filtering.

Then, the MTI processing synthesizes the generated suppressed data Sm (t0, fb) in respective channels, then detects the detection threshold of the synthesized suppressed data Smk (t0, fb). The detection threshold is detected by using a constant false alarm rate (hereinafter referred to CFAR) method, for example. The CFAR refers to a method for setting the detection threshold based on the signal power close to the distance bin for setting the detection threshold.

The MTI processing is capable of reducing the signal to be suppressed when an amplitude or a phase component of the signal to be suppressed varies even just a little with respect to time, but the signal may not be completely removed by the MTI processing. In the case where the signal may not be completely removed, the power of the signal to be suppressed may be larger than the detection threshold.

Here, because of a vibration accompanied by the travelling of the vehicle 80, minute variation in a range of millimeter order or less may be detected in the positions between the bumper 81, the internal parts 82, the transmission antenna 30 and the reception antenna 40. Hence, the phase component of the amplitude of the synthesized complex data Sk (t, fb) indicating the vehicle internal reflection signal may be slightly varied with respect to time. Accordingly, even when the MTI processing is applied to the synthesized complex data Sk (t0, fb) at time t0 calculated by the radar apparatus 100, the power of the internal reflection signal may become larger than the detection threshold.

In this respect, according to the present embodiment, the processing unit 10 averages, for each channel and each frequency bin, the FFT complex data S (t, fb) in the period from time t0 to time t0−(N−1) in time series, thereby calculating the average data Sav (t0, fb). Then, the processing unit 10 synthesizes the average data Sav (t0, fb) for respective channels to calculate a synthesized average data Savk (t0, fb), and feedbacks the calculated synthesized average data Savk (t0, fb) to the detection threshold. In other words, the detection threshold of the frequency bin, where the vehicle internal reflection signal is observed, is controlled to be larger depending on the amount of the power of the vehicle internal reflection signal, thereby suppressing the erroneous detection of the vehicle internal reflection signal. According to the present embodiment, the synthesized average data Savk (t0, fb) corresponds to average data.

<2-3. Peak Detection Process>

Next, a procedure of the peak detecting process executed by the processing unit 10 will be described with reference to the flowchart shown in FIG. 9.

First, at step S300, the processing unit 10 determines, based on the detection signal received from the vehicle speed sensor 70, whether the vehicle 80 has moved in an averaging period which will be described later. In the case where the vehicle 80 is stopped without moving at all in the averaging period, the process proceeds to step S320, and in the case where the vehicle 80 has moved in the averaging period, the process proceeds to step S310.

At step S310, the processing unit 10 averages, for each channel and each frequency bin, the FFT complex data S (t, fb) in a predetermined averaging period, to calculate the average data Sav (t0, fb). Assuming that the averaging period is a period corresponding to t0−nT (n=9, 1, . . . N−1), the average data Sav (t0, fb) of the respective channels are expressed by the following equation (3). Further, the processing unit 10 synthesizes the average data Sav (t0, fb) for K-channel to calculate the synthesized average data Savk (t0, fb). Specifically, the processing unit 10 stores all of the calculated FFT complex data (t, fb) calculated at the past N processing cycles and calculate an average of the N FFT complex data (t, fb).

The processing unit 10 may calculate the average data Sav (t0, fb) in the current cycle in accordance with the latest FFT complex data (t0, fb) at time t0 and the average data Sav (t0−1, fb) in the previous cycle.

[Math 3]

$$S_{av}(t_0, f_b) = \frac{1}{N}\sum_{n=0}^{N-1} s(t_0 - nT, f) \quad (3)$$

Figure 10:
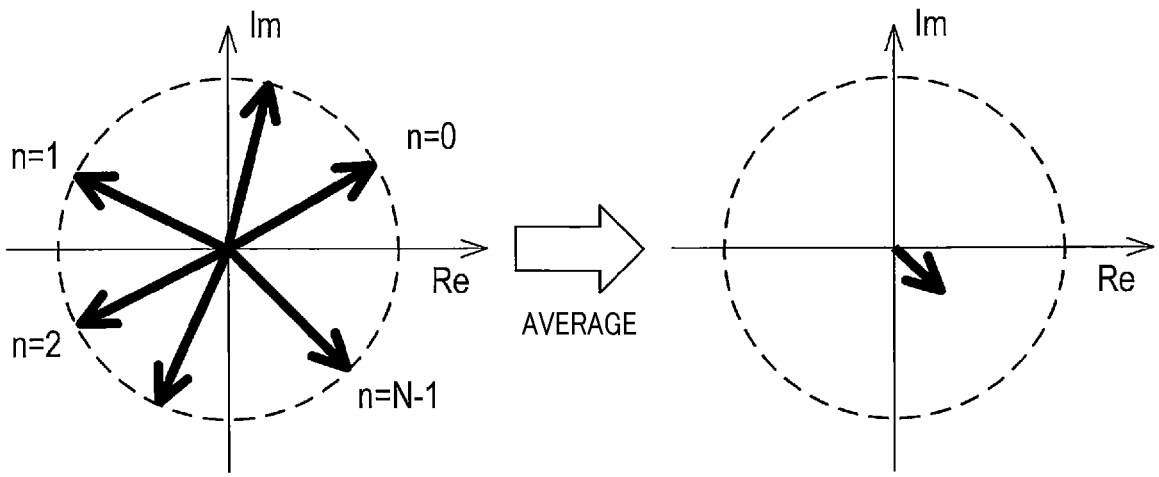
FIG. 10 is a diagram showing vectors of average data when the relative position between the radar apparatus and a reflector varies.

As shown in FIG. 10, in the case where the relative position between the radar apparatus 100 and the reflector varies (i.e. variation over a range of millimeter order), the phase of the amplitude of the FFT complex data S (t, fb) randomly varies. Hence, the magnitude of the average vector is significantly small. As a result, the power of the average data Sav (t0, fb) decreases by 10×log 10 (N).

Figure 11:
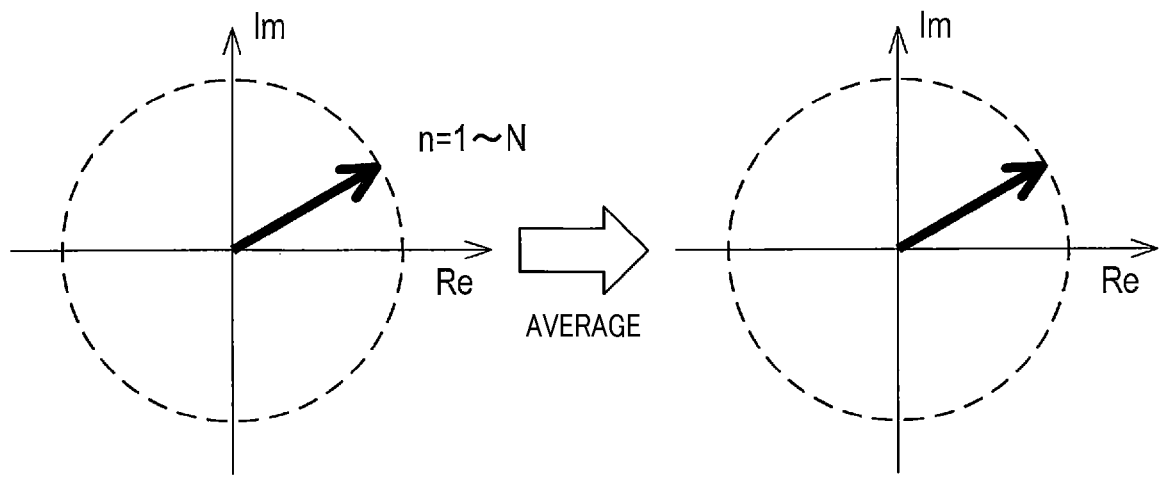
FIG. 11 is a diagram showing vectors of average data when the relative position between the radar apparatus and the reflector does not vary.

On the other hand, as shown in FIG. 11, in the case where the relative position between the radar apparatus 100 and the reflector substantially does not vary (i.e. variation less than a range of millimeter order), a variation in the phase of the amplitude of the FFT complex data S (t, fb) is small. Thus, even by the averaging, the magnitude and the direction of the vector does not significantly change. As a result, the power of the average data Sav (t0, fb) almost equals the power of the FFT complex data S (t0, fb). Accordingly, compared to the synthesized complex data Sk (t0, fb), the power of the synthesized average data Savk (t0, fb) does not change in a frequency bin at which the vehicle internal reflection signal is observed, and changes to be significantly lowered in a frequency bin at which the target reflection signal is observed.

In the case where the vehicle 80 is stationary, the relative position between the radar apparatus 100 and the stationary object does not vary, whereby the phase of the amplitude of the FFT complex data S (t, fb) indicating the stationary object does not vary with respect to time. Hence, in the case where the processing unit 10 averages a plurality of FFT complex data S (t, fb) including the FFT complex data S (t, fb) calculated from the discrete beat signal b (t) acquired during the vehicle 80 being stopped, the power of the synthesized average data Savk (t0, fb) indicating the reflection signal from the stationary object is not suppressed. As a result, the detection threshold in which synthesized average data Savk (t0, fb) (later described) is feedbacked increases in a frequency bin at which the stationary object is observed and thus the stationary object cannot be detected sometimes. Therefore, the processing unit 10 calculates the average data Sav (t0, fb) and the synthesizes average data Savk (t0, fb) only when the vehicle 80 is moving in the averaging period.

Further, the processing unit 10 limits the distance range with which the average data Sav (t0, fb) and the synthesized average data Savk (t0, fb) are calculated, that is a range of the frequency bin, to be a range determined based on the longitudinal length of the vehicle 80. The internal reflection signal is observed within a range of the vehicle length from the front end to the rear end of the vehicle 80, but is not observed in distant area exceeding the vehicle length. Accordingly, the processing unit 10 limits the distance range with which the average data Sav (t0, fb) and the synthesized average data Savk (t0, fb) are calculated, to be a range within the vehicle length of the vehicle 80 or a range within a value in which a margin value is added to the vehicle length of the vehicle 80, for example.

Also, the averaging period is a period in which the phase of the amplitude of the FFT complex data S (t, fb) indicating a target to be detected. For example, in the case where the carrier frequency fc is 24 GHz, the averaging period may be set to be larger than or equal to 1 second. Also, if the averaging period is significantly long, when the power of the detected target reflection signal is large, the power of the average data Sav (t, fb) corresponding to its frequency bin stays at a large value for a while. Hence, the averaging period may be set, for example, to be less than or equal to 10 seconds when the carrier frequency fc is 24 GHz, in which an influence of the detected reflection signal is not prolonged.

Subsequently, at step S320, the processing unit 10 determines the detection threshold. Specifically, the processing unit 10 adds an addition value X (dB) to the power value of the synthesized average data Savk (t0, fb) to calculate the first threshold as a function of the frequency. The addition value X (dB) is a predetermined positive value as a margin value which is set depending on the accuracy of the synthesized average data Savk (t0, fb). At step S310, in the case where the synthesized average data Savk (t0, fb) is not calculated, the power value of the synthesized average data Savk (t0, fb) is zero.

Further, the processing unit 10 calculates the second threshold based on noise power in an observation of the radar apparatus 100. The processing unit 10 adds an addition value Y (dB) to the total value of the noise power summed for the respective channels to calculate the second threshold as a function of the frequency. The addition value Y (dB) is a predetermined value as a margin value set depending on an erroneous detection rate.

Figure 12:
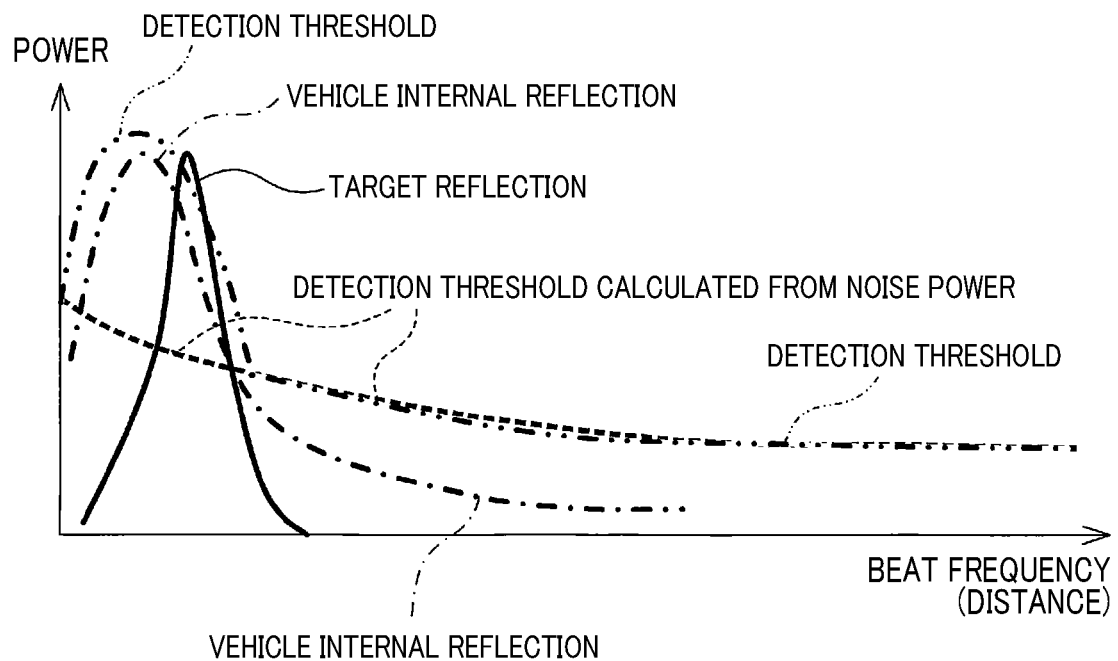
FIG. 12 is a diagram showing the spectrum power of the target reflection and the internal reflection of the vehicle, the threshold calculated from the noise power and a detection threshold according to the first embodiment.
Figure 13:
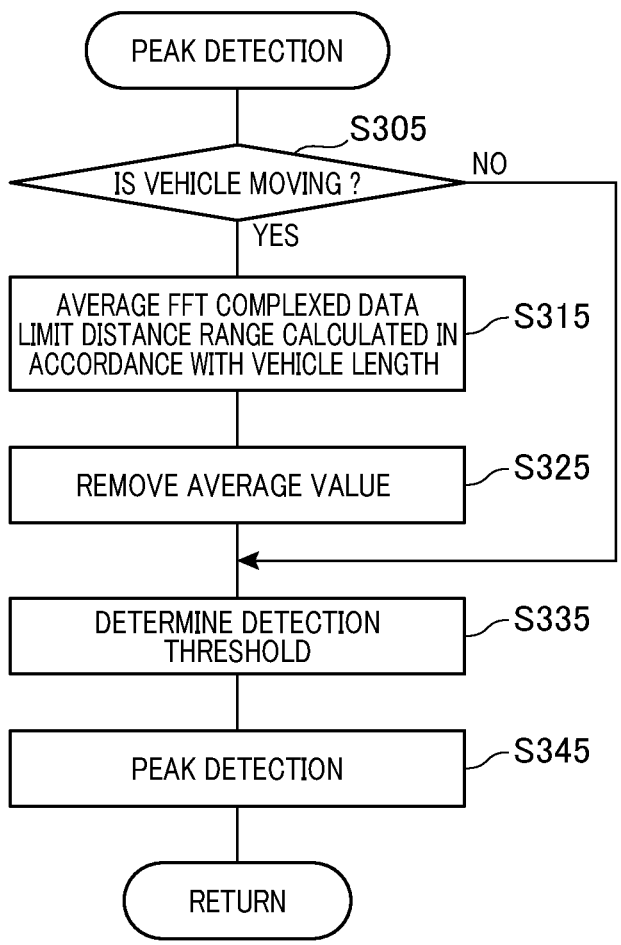
FIG. 13 is a flowchart showing a procedure of a peak detecting process according to a second embodiment.

Further, the processing unit 10 compares the first threshold with the second threshold for each frequency bin and determines a larger value to be the detection threshold. As shown with a two dotted line in FIG. 12, the determined detection threshold is the first threshold in the vicinity of the radar apparatus 100 in which the vehicle internal reflection signal is observed, and being a larger value than the synthesized complex data Sk (t0, fb). Also, the determined detection threshold shows the second threshold in a distant area with respect to the radar apparatus 100.

Subsequently, at step S330, the processing unit 10 compares the synthesized complex data Sk (t, fb) with the detection threshold determines at step S320 for each frequency bin, thereby detecting a peak corresponding to a frequency in which the synthesized complex data Sk (t, fb) is larger than the detection threshold and indicating the maximum. Then process terminates the procedure.

According to the present embodiment, the process at step S310 corresponds to a function of an average calculation unit accomplished by the processing unit 10, the process at step S320 corresponds to functions of a first threshold calculation unit, a second threshold calculation unit and a detection threshold calculation unit. Moreover, a process at step S330 corresponds to a function of a peak detecting unit.

3. Effects and Advantages

According to the first embodiment described above, the following effects and advantages are obtained.

(1) The first threshold in which the synthesized average data Savk (t0, fb) is feedbacked and the second threshold calculated noise power are compared and the larger value is determined as the detection threshold. Thus, the detection threshold becomes the first threshold in the vicinity of the radar apparatus 100 which is larger than the power value of the vehicle internal reflection signal. Therefore, erroneous detection of the vehicle internal reflection signal can be suppressed.

(2) The FFT complex data S (t0, fb), which is calculated from the discrete beat signal b (t) acquired during the vehicle 80 being moved, is only averaged thereby calculating the average data Sav (t0, fb). Thus, it is possible to suppress a case where a target of a stationary object existing around the vehicle 80 is unable to be detected.

(3) The distance range for calculating the average data Sav (t0, fb) and the synthesized average data Savk (t0, fb) is limited to a range based on the vehicle length. Hence, it is possible to suppress erroneous detection of the internal reflection signal without increasing an amount of threshold in the distance area where an internal reflection does not theoretically occur.

Second Embodiment

<Difference Between the Second Embodiment and the First Embodiment)

Since the second embodiment has fundamental configurations similar to those in the first embodiment, an explanation of the common configurations is omitted and configurations differing from those of the first embodiment will be mainly described. Note that the same reference numbers as those in the first embodiment indicate the same configurations as those in the first embodiment, and foregoing explanations will be applied thereto.

According to the above-described first embodiment, in the peak detecting process, the synthesized average data Savk (t0, fb) is feedbacked to the detection threshold. In contrast, according to the second embodiment, in the peak detecting process, the synthesized average data Savk (t0, fb) is feedbacked to the detection threshold, and for every frequency bin, the synthesized complex data Sk (t0, fb) is updated to a value in which the synthesized average data Savk (t0, fb) is subtracted from the synthesized complex data Sk (t0, fb).

<2. Peak Detecting Process>

Next, a peak detecting process executed by the processing unit 10 of the second embodiment instead of executing the peak detecting process according to the first embodiment, will be described.

Figure 9:
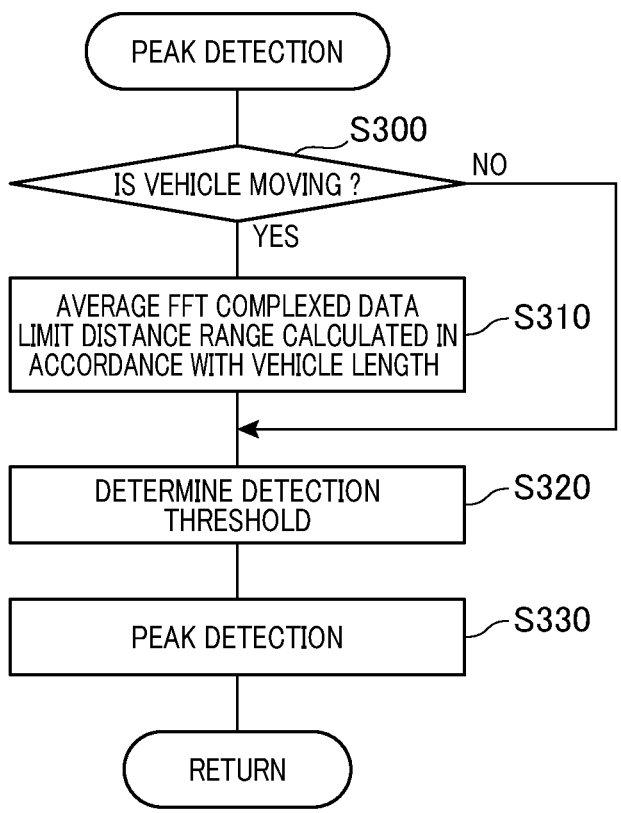
FIG. 9 is a flowchart showing a procedure of a peak detecting process according to the first embodiment.

First, at steps S305 and S315, the processing unit 10 executes processes similar to steps S300 and S310 shown in FIG. 9.

Subsequently, at step S325, as shown FIG. 4, the processing unit 10 updates, for each channel and each frequency bin, the FFT complex data S (t0, fb) to be a subtracted value. The subtracted value is a value in which the average data Sav (t0, fb) is subtracted from the FFT complex data S (t0, fb).

$$S(t0,fb)=S(t0,fb)-Sav(t0,fb) \qquad (4)$$

Then, the processing unit 10 synthesizes the FFT complex data S (t0, fb) for respective channels to calculate the synthesized complex data Sk (t0, fb). As described above, compared with the power of the FFT complex data S (t0, fb), the power of the average data Sav (t0, fb) does not change at a frequency bin at which the vehicle internal reflection signal is observed and decreases relatively greatly at a frequency bin at which the target reflection signal is observed.

Figure 14:
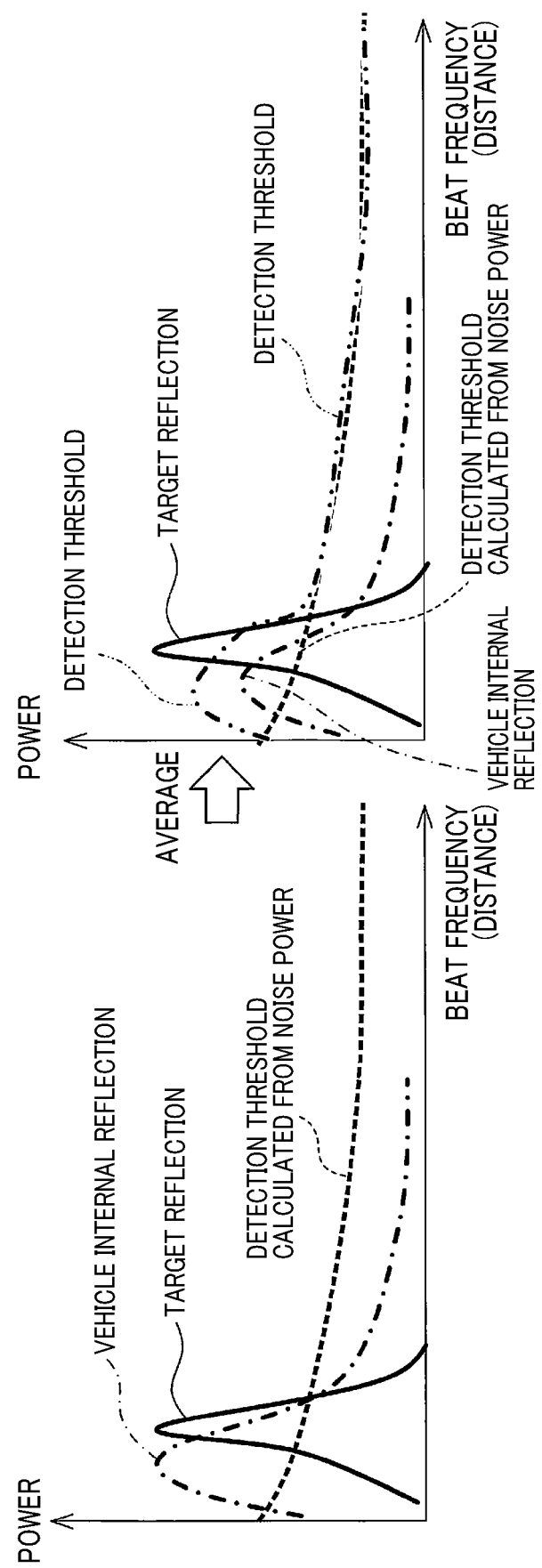
FIG. 14 is a diagram showing the spectrum power of the target reflection and the internal reflection of the vehicle and a detection threshold according to the second embodiment.

In the left-side graph of FIG. 14, the FFT complex data S (t0, fb) before being updated and the threshold calculated based on the noise power are shown. In the right-side graph of FIG. 14, the FFT complex data S (t0, fb) after being updated and the threshold calculated based on the noise power are shown. As shown in FIG. 14, the power of the updated FFT complex data S (t0, fb) decreases relatively greatly at a frequency bin at which the vehicle internal reflection signal is observed compared with a case before updating, but rarely decreases at a frequency bin at which the target reflection signal is observed.

Subsequently, at step S335, the processing unit 10 adds an addition value X (db) to the power value of the synthesized average data Savk (t0, fb) to calculate the first threshold as a function of the frequency. According to the present embodiment, since the power of the post updated FFT complex data S (t0, fb) significantly decrease at the frequency bin at which the vehicle internal reflection signal is observed compared with a case before updating, the addition value X (dB) is set to be a negative value.

Further, the processing unit 10 calculates the second threshold similar to the process of step S320 shown in FIG. 9 and compares the first threshold with the second threshold for each frequency bin, thereby determining the larger value to be the detection threshold. As shown by the two dotted line in FIG. 14, the detection threshold is larger than the power of the synthesized complex data Sk (t0, fb) indicating the vehicle internal reflection signal and smaller than the power of the synthesized complex data Sk (t0, fb) indicating the target reflection signal.

Next, at step S345, similar to the process at step S330 shown in FIG. 9, the processing unit 10 compares the synthesized complex data Sk (t, fb) calculated at step S325 with the detection threshold determined at step S335 to detect the peak. Then, the process terminates the procedure.

Note that the process at step S325 corresponds to a function of a updating unit accomplished by the processing unit 10, according to the present embodiment.

3. Effects and Advantages

According to the above-described second embodiment, the following effects and advantages can be obtained in addition to the above-described effects and advantages (1) to (3) of the first embodiment.

(4) The FFT complex data S (t0, fb) is updated to be a value in which the average data Sav (t0, fb) is subtracted from the FFT complex data S (t0, fb) for each channel and each frequency bin. Thus, the FFT complex data S (t0, fb) indicating the internal reflection signal is suppressed, and the difference between the power value of the FFT complex data S indicating the internal reflection signal and the power value of the FFT complex data S (t0, fb) indicating the target reflection signal becomes large. Then, a negative addition value X is added to the power value of the synthesized average data Savk (t0, fb), thereby calculating the first threshold which is a value between the power value of the FFT complex data S (t0, fb) indicating the internal reflection signal and the power value of the FFT complex data S (t0, fb) indicating the target reflection signal. Accordingly, the target reflection signal from a target located around the radar apparatus 10 can be appropriately detected while suppressing erroneous detection of the vehicle internal reflection signal.

Other Embodiments

Embodiments of the present disclosure have been described so far. The present disclosure is not limited to the above-described embodiments and can be modified and embodies in various manners.

(a) According to the above-described embodiments, a FMCW method is used as a modulation method of the radar apparatus 10. However, the modulation method is not limited to the FMCW. The present disclosure can be applied to all of modulation methods capable of extracting phase information (e.g. multiple frequency CW method, or pulse wave method).

(b) Assuming that a set of upward inclined wave and the downward inclined wave is a transmission wave, intervals between the transmission waves are not necessarily the same interval. In other words, intervals between processing cycles may not be equal.

(d) The present disclosure may be accomplished by manners such as a system including the radar apparatus as a constituent other than the above-described radar apparatuses, a program for causing a computer function as a processing unit of the radar apparatus, a non-transitory tangible recording media such as a semiconductor memory device storing the program, and a peak detecting method.

CONCLUSION

A first aspect of the present disclosure is a radar apparatus mounted on a vehicle, and provided with a transmission antenna, a reception antenna, a signal acquiring unit, a data calculation unit, an average calculation unit, a first threshold calculation unit, a second threshold calculation unit, a detection threshold calculation unit and a peak detecting unit. The transmission antenna is configured to transmit radar waves. The reception antenna is configured to receive reflected waves produced by reflection of the radar waves. The signal acquiring unit is configured to acquire a reception signal based on the reflected waves. The data calculation unit is configured to perform a frequency analysis applied to the reception signal acquired by the signal acquiring unit to calculate a complex data as a function of a frequency. The average calculation unit is configured to calculate an average data in which a plurality of the complex data in a predetermined period before current processing cycle are averaged for each frequency bin. The first threshold calculating unit is configured to add a predetermined addition value to a power value of the average data calculated by the average calculation unit to calculate a first threshold as a function of a frequency. The second threshold calculation unit is configured to calculate a second threshold as a function of a frequency based on a noise power in an observation of the radar apparatus. The detection threshold calculation unit is configured to compare the first threshold calculated by the first threshold calculation unit with the second threshold calculated by the second threshold calculation unit for each frequency bin, and determine a larger value to be a detection threshold. The peak detecting unit is configured to compare a power value of the complex data in the current processing cycle with the detection threshold, thereby detecting a peak corresponding to a frequency in which the power value of the complex data is larger than the detection threshold and indicating the maximum.

According to the first aspect of the present disclosure, the complex data calculated in the predetermined period are averaged for each frequency bin, thereby calculating the average data. Then, an addition value is added to the power value of the average data to calculate the first threshold. Since the relative position between the bumper or the internal parts of the vehicle and the radar apparatus rarely changes in the predetermined period, the phase of the amplitude of the complex data indicating the vehicle internal reflection signal in the respective processing cycles rarely changes. On the other hand, the relative position between the target and the radar apparatus changes in the predetermined period. Hence, the amplitude and/or the phase of the complex data indicating the target reflection signal in the respective processing cycles randomly changes. Accordingly, the power value of the average data rarely changes at the frequency bin at which the internal reflection signal is observed, comparing with the power value of the complex data in the current processing cycle, and the power value of the average data decreases relatively greatly. Therefore, the target reflection signal influences the first threshold less, and the first threshold becomes approximately a value in which the addition value is added to the power value of the complex data indicating the internal reflection signal.

Further, the first threshold and the second threshold calculated from the noise power are compared, thereby determining the larger value to be the detection threshold. Specifically, in the case where the power value of the internal reflection signal is larger than that of the noise power, the first threshold based on the power value of the internal reflection signal is calculated. Then, the power value of the complex data in the current processing cycle and the detection threshold is compared to detect the peak frequency. Accordingly, the power value of the average data is feed backed to the detection threshold, whereby erroneous detection of the internal reflection signal of the vehicle can be suppressed.

What is claimed is:
1. A radar apparatus mounted on a vehicle comprising:
a transmission antenna configured to transmit radar waves;
a reception antenna configured to receive reflected waves produced by reflection of the radar waves;
a signal acquiring unit configured to acquire a reception signal based on the reflected waves;
a data calculation unit configured to perform a frequency analysis applied to the reception signal acquired by the signal acquiring unit to calculate complex data as a function of a frequency;
an average calculation unit configured to calculate an average data in which a plurality of the complex data in a predetermined period before a current processing cycle are averaged for each frequency bin, the plurality of complex data in the predetermined period that is used to calculate the average data being based on one or more reflected waves that respectively correspond to reflection of one or more of the radar waves off of one or more objects;
a first threshold calculation unit configured to add a predetermined addition value to a power value of the average data calculated by the average calculation unit to calculate a first threshold as a function of a frequency;
a second threshold calculation unit configured to calculate a second threshold as a function of a frequency based on a noise power in an observation of the radar apparatus;
a detection threshold calculation unit configured to compare the first threshold calculated by the first threshold calculation unit with the second threshold calculated by the second threshold calculation unit for each frequency bin, and determine a larger value thereof to be a detection threshold; and
a peak detecting unit configured to compare a power value of the complex data in the current processing cycle with the detection threshold, thereby detecting a peak corresponding to a frequency in which the power value of the complex data is larger than the detection threshold and indicating the maximum.

2. The radar apparatus according to claim 1, wherein:
the predetermined addition value is a negative value;
the radar apparatus further comprises an updating unit configured to update the complex data calculated by the data calculation unit in the current processing cycle;
the subtracted value is a value in which the average data calculated by the average calculation unit is subtracted from the complex data for each frequency bin; and
the peak detecting unit is configured to compare a power value of the complex data which is updated by the updating unit with the detection threshold, thereby detecting the peak corresponding to the frequency.

3. The radar apparatus according to claim 1, wherein:
the average calculating unit is configured to calculate the average data under a condition in which the vehicle is moving in the predetermined period.

4. The radar apparatus according to claim 1, wherein:
the frequency of the complex data calculated by the data calculation unit represents distance information with respect to the radar apparatus; and
the average calculating unit is configured to limit a distance range with which the average data is calculated to be a range determined based on a length of the vehicle.

5. The radar apparatus according to claim 1, wherein at least one of the one or more reflected waves that respectively correspond to reflection of one or more of the radar waves off of one or more objects corresponds to an internal reflection off of an object of the vehicle.

* * * * *